(12) United States Patent
Chambon et al.

(10) Patent No.: US 9,640,976 B2
(45) Date of Patent: May 2, 2017

(54) OVERVOLTAGE PROTECTION SYSTEM FOR WIRELESS POWER TRANSFER SYSTEMS

(71) Applicant: UT-Battelle, LLC, Oak Ridge, TN (US)

(72) Inventors: Paul H. Chambon, Knoxville, TN (US); Perry T. Jones, Knoxville, TN (US); John M. Miller, Oak Ridge, TN (US); Omer C. Onar, Knoxville, TN (US); Lixin Tang, Knoxville, TN (US); Clifford P. White, Seymour, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 139 days.

(21) Appl. No.: 14/631,903

(22) Filed: Feb. 26, 2015

(65) Prior Publication Data

US 2016/0254659 A1 Sep. 1, 2016

(51) Int. Cl.
*H02J 7/00* (2006.01)
*H01F 27/42* (2006.01)
*H02H 3/20* (2006.01)
*B60L 11/18* (2006.01)

(52) U.S. Cl.
CPC ............ *H02H 3/202* (2013.01); *B60L 11/182* (2013.01); *B60L 11/1851* (2013.01)

(58) Field of Classification Search
CPC ............. H02J 5/005; H02J 17/00; H02J 7/025
USPC .................. 320/108; 307/104; 361/91; 702/8
See application file for complete search history.

(56) References Cited

U.S. PATENT DOCUMENTS

| 8,439,270 | B2 | 5/2013 | Nishijima |
| 2003/0088595 | A1 | 5/2003 | Chang et al. |
| 2012/0223591 | A1 | 9/2012 | Cheon et al. |
| 2012/0293900 | A1 | 11/2012 | Kim et al. |
| 2013/0176653 | A1 | 7/2013 | Kim et al. |

(Continued)

FOREIGN PATENT DOCUMENTS

| KR | 10-0903463 | 10/2009 |
| WO | 2013/145403 A1 | 3/2013 |

(Continued)

OTHER PUBLICATIONS

International Search Report and Written Opinion dated May 5, 2016 received in International Application No. PCT/US2016/019522.

*Primary Examiner* — M'Baye Diao
(74) *Attorney, Agent, or Firm* — Scully, Scott, Murphy & Presser, P.C.

(57) ABSTRACT

A wireless power transfer overvoltage protection system is provided. The system includes a resonant receiving circuit. The resonant receiving circuit includes an inductor, a resonant capacitor and a first switching device. The first switching device is connected the ends of the inductor. The first switching device has a first state in which the ends of the inductor are electrically coupled to each other through the first switching device, and a second state in which the inductor and resonant capacitor are capable of resonating. The system further includes a control module configured to control the first switching device to switching between the first state and the second state when the resonant receiving circuit is charging a load and a preset condition is satisfied and otherwise, the first switching device is maintained in the first state.

20 Claims, 13 Drawing Sheets

(56) References Cited

U.S. PATENT DOCUMENTS

| | | | |
|---|---|---|---|
| 2014/0063666 A1 | 3/2014 | Kallal et al. | |
| 2014/0125142 A1* | 5/2014 | Kanno | H02J 50/12 |
| | | | 307/104 |
| 2014/0134548 A1 | 5/2014 | Broker et al. | |
| 2014/0183965 A1* | 7/2014 | Okazaki | H02J 50/12 |
| | | | 307/104 |
| 2014/0361736 A1 | 12/2014 | Kwon et al. | |
| 2015/0015197 A1 | 1/2015 | Mi et al. | |
| 2015/0214788 A1* | 7/2015 | Hosotani | H02J 17/00 |
| | | | 307/104 |
| 2015/0280455 A1* | 10/2015 | Bosshard | H02J 5/005 |
| | | | 307/104 |
| 2016/0056640 A1* | 2/2016 | Mao | H02J 50/10 |
| | | | 307/104 |
| 2016/0231840 A1* | 8/2016 | Bae | G06F 3/041 |

FOREIGN PATENT DOCUMENTS

| | | |
|---|---|---|
| WO | 2013/112526 A1 | 8/2013 |
| WO | 2013/176410 A1 | 11/2013 |

\* cited by examiner

OVERVOLTAGE PROTECTION SYSTEM FOR WIRELESS POWER TRANSFER SYSTEMS

STATEMENT REGARDING FEDERALLY SPONSORED RESEARCH OR DEVELOPMENT

This invention was made with government support under Contract No. DE-AC05-00OR22725 awarded by the U.S. Department of Energy. The government has certain rights in the invention.

FIELD OF THE DISCLOSURE

This disclosure relates generally to wireless power transfer for charging a load coupled to a wireless power receiving circuit. More particularly, this disclosure relates to overvoltage protection devices and techniques for protecting circuit components of a wireless power transfer system.

BACKGROUND

Wireless power transfer systems can be used to charge various loads in electronic devices. A wireless power transfer system has an advantage that a physical connection to a charging unit is not required. Thus, there is no requirement for the electronic device to have an external connection port to be coupled to a charging unit or charging station.

A wireless power transfer system includes a transmitting circuit and a receiving circuit. The receiving circuit typically includes a reception coil and energy is transferred from the transmitting circuit, which also has a coil via induction. Accordingly, the receiving circuit will resonant based on a tuned resonant frequency.

SUMMARY

Disclosed is a wireless power transfer overvoltage protection system. The wireless power transfer overvoltage protection system protects circuit components so that a high voltage does not appear on the circuit components in a case where there is a communication failure or where one or more circuit components fail which prevent a wireless power transfer system from being connected to a load.

A disclosed wireless power transfer overvoltage protection system comprises a resonant receiving circuit which includes, an inductor, a resonant capacitor and a first switching device and a control module. The inductor has a first end and a second end. The first switching device is connected between the first end and the second end of the inductor. The resonant receiving circuit is connected to a rectifier and a filter capacitor. The first switching device has a first state in which the first end and the second end of the inductor are electrically coupled to each other through the first switching device, and a second state in which the inductor and resonant capacitor are capable of resonating. The control module configured to control the first switching device to switching between the first state and the second state when the resonant receiving circuit is charging a load and a preset condition is satisfied. Otherwise, the first switching device is maintained in the first state.

The first switching device can be a relay or a semiconductor switching device.

The disclosed wireless power transfer overvoltage protection system can be used to protect wireless power transfer systems used to charge various loads in electronic devices. For example, the wireless power transfer overvoltage protection system can be used to protect wireless power transfer systems for automotive machines such as electric or hybrid electric vehicles or devices.

Also disclosed is a battery charging system which is an example of a wireless power transfer system. The battery charging system can be used to charge a battery of a vehicle. The battery charging system includes a wireless power transfer circuit having an inverter and transmitting inductor and resonant capacitor configured to inductively provide power to a resonant receiving circuit. The resonant receiving circuit includes an inductor, a resonant capacitor and a first switching device and a control module. The inductor has a first end and a second end. The first switching device is connected between the first end and the second end of the inductor. The resonant receiving circuit is connected to a rectifier and a filter capacitor. The first switching device has a first state in which the first end and the second end of the inductor are electrically coupled to each other through the first switching device, and a second state in which the inductor and resonant capacitor are capable of resonating. The control module configured to control the first switching device to switching between the first state and the second state when the resonant receiving circuit is charging a load and a preset condition is satisfied. Otherwise, the first switching device is maintained in the first state. A battery can be coupled to the resonant receiving circuit for receiving power inductively provided to the resonant receiving circuit.

The vehicle can be land-based, water-based or air-based, such as but not limited to, automobile, a shuttle, a trolley, a golf-type cart, a forklift or other mobile devices.

BRIEF DESCRIPTION OF THE FIGURES

The following detailed description, given by way of example and not intended to limit the disclosure solely thereto, will best be appreciated in conjunction with the accompanying drawings, wherein like reference numerals denote like elements and parts, in which.

DETAILED DESCRIPTION

A wireless power transfer system includes a transmitting circuit and a receiving circuit. Hereinafter the receiving circuit is referred to as a resonant receiving circuit or a resonant circuit. The resonant receiving circuit includes an inductor connected to a resonant capacitor. The inductor and resonant capacitor can be connected in series or in parallel.

The resonant receiving circuit also includes a switching device. The switching device is configured to prevent the voltage in the resonant receiving circuit and downstream components to rise to a level which can damage the components, e.g., a voltage runaway. Extensive voltage can occur when there is a communication failure between the transmitting circuit and the resonant receiving circuit. Additionally, extensive voltage can occur when a load is not properly coupled to the resonant receiving circuit. For example, without a load such as a battery, a voltage across the inductor and resonant capacitor will tend to increase because there is no load to absorb the current from the inductor and resonant capacitor.

The switching device can be a switch or a relay device such as, but not limited to a single pole single throw relay (SPST) or a single pole double throw relay (SPDT). Alternatively, a semiconductor device operating in a switching mode can be the switching device. The semiconductor device can be, but is not limited to, a Metal Oxide Semiconductor Field Effect Transistor (MOSFET), an Insulated-Gate Bipolar Transistor (IGBT), Bipolar Junction transistor (BJT) and Triac. The semiconductor device can provide high speed switching.

Figure 1:
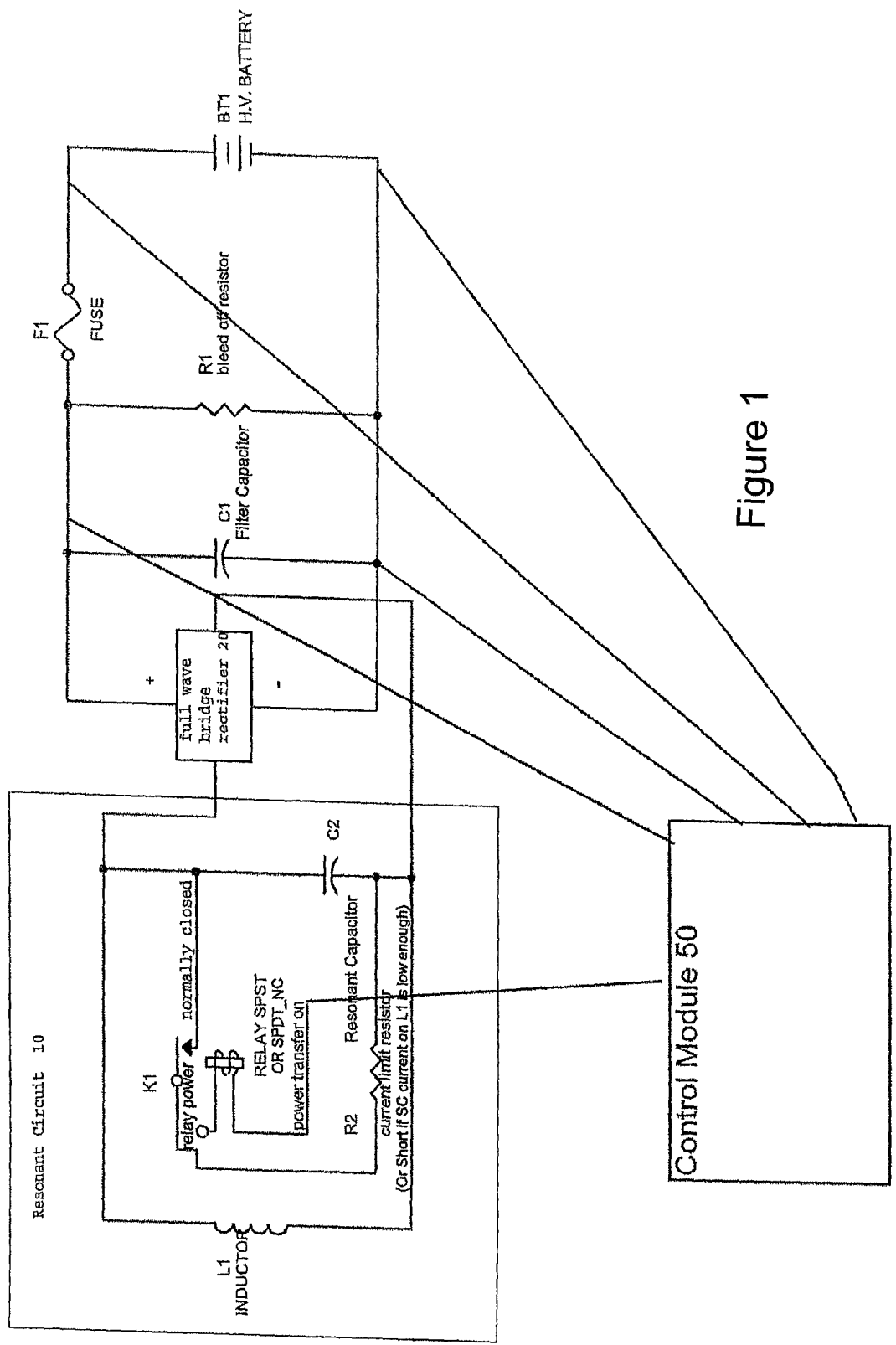
FIG. 1 illustrates an example of a wireless power transfer overvoltage protection system in accordance with aspects of the disclosure.

FIG. 1 illustrates an example of a wireless power transfer overvoltage protection system in accordance with aspects of the disclosure.

The wireless power transfer overvoltage protection system 1 includes a resonant circuit (resonant receiving circuit) 10. The resonant circuit 10 includes an inductor L1, a resonant capacitor C2 and a relay K1 (example of the switching device). As depicted in FIG. 1, the inductor L1 is connected in parallel with the resonant capacitor C2. As will be described later, the inductor L1 and resonant capacitor C2 can also be connected in series. The relay K1 is connected between the inductor L1 and resonant capacitor C2. The inductor L1 and resonant capacitor C2 is tuned to the frequency of the transmitting circuit. The transmitting circuit (not shown in FIG. 1) includes an inductor (transmitting coil). The switching device is configured to withstand a short circuit current of the inductor L1. For example, the switching device can be configured to withstand a short circuit current up to at least 500 A. The short circuit current may vary depending on the size of the coils. A small coil may have a short circuit current of 20-30 A. Larger coils would have a larger short circuit current.

The relay K1 is depicted as a SPST. However, the relay K1 can also be a SPDT. One end of the inductor L1 is connected to a contact of the relay K1. FIG. 1 shows that the relay is normally closed, which refers to the end of the inductor L1 being connected to a contact of the relay K1 that is normally closed. Normally closed refers to the default position of the relay K1. If a SPDT relay is used, the end of the inductor L1 is connected to the normally closed contact of the relay K1 (as opposed to the normally opened contact). The other end of the inductor L1 is connected to a second contact of the relay K1. FIG. 1 shows a current limit resistor R2 connected in series with the relay K1. The current limit resistor R2 is optional and can depend on the short circuit current of the inductor L1. If not needed, R2 would be replaced with a direct wire connection.

Power is provided to the relay K1 via the relay power contact. If the wireless power transfer overvoltage protection system is provided as part of a wireless power transfer system for a vehicle, the power can be provided to the relay K1 from an on-board power supply.

A switching signal is supplied to another contact, labeled as "power transfer on". The switching control signal is generated by the Control Module 50. The Control Module 50 is electrically connected to the contact. The Control Module 50 will be described later in detail.

When the relay K1 is closed, the ends of the inductor L1 are shorted. When the relay K1 is opened, the resonant circuit 10 is capable of resonating. Thus, the switching signal has two levels: a first level equal to the power provided to relay K1 and a second level less than the power. Changing the level of the switching signal causes the relay K1 to open or close the contact. Similarly, where a SPDT relay is used, since one end of the inductor L1 is connected to the normally closed contact, when the switch signal changes, the normally closed contact opens.

The output of the resonant circuit 10 can be used to charge a load, such as a H.V. Battery BT1 via a generated power processing circuitry. The generated power processing circuitry includes a full wave bridge rectifier 20, a filter capacitor C1 and a bleed off resistor R1. A fuse F1 is also included. The power induced in the resonant circuit 10 is rectified by the full wave bridge rectifier 20. While the figures depict a full wave bridge rectifier 20, other rectifier can be used such as a half wave bridge rectifier.

Figure 2A:
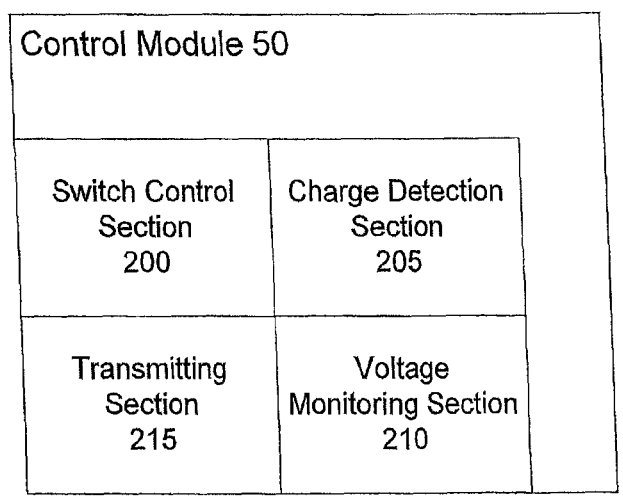
FIG. 2A illustrates a functional block diagram of an example of a control module in accordance with aspects of the disclosure.

FIG. 2A illustrates a functional block diagram of an example of a Control Module 50 in accordance with aspects of the disclosure. The Control Module 50 can be analog or digital. For example, the Control Module 50 can be a microcontroller or microprocessor. Additionally, the Control Module 50 can be an analog circuit.

The Control Module 50 includes a Switch Control Section 200, a Charge Detection Section 205 and Voltage Monitoring Section 210. Optionally, the Control Module 50 can include a Transmitting Section 215. The Transmitting Section 215 can be used in a closed loop system to provide feedback to the transmitting side of a wireless power transfer system. Alternatively, an open loop wireless power transfer system can be used without feedback, thus, the Transmitting Section can be omitted.

The Switch Control Section 200 controls the switching of the switching device based on information received from the Charge Detection Section 205 and Voltage Monitoring Section 210. The Switch Control Section 200 generates the switching signal for input to the switching device. The Switch Control Section 200 outputs a switching signal which causes the switching device such as the relay K1 to open when the load, e.g., H.V. Battery BT1 is to be charged.

When a H.V. Battery BT1 is not being actively charged, the Switch Control Section 200 outputs a switching signal which causes the switching device such as the relay K1 to either maintain a closed state or close, if opened.

The Charge Detection Section 205 determines if the battery is to be charged. If the H.V. Battery BT1 is to be charged, the Charge Detection Section 205 notifies the Switch Control Section 200.

The Voltage Monitoring Section 210 monitors the DC voltage level on the filter capacitor C1 which is indicative of the power coupled to the H.V. Battery BT1. In an aspect of the disclosure, if the monitored voltage level or change in voltage level is greater than a trigger level, the Switch Control Section 200 outputs a switching signal which causes the switching device such as the relay K1 to close.

The Transmitting Section 215 transmits the detected DC voltage level to the transmitting circuit as feedback. In another aspect of the disclosure, the Transmitting Section 215 also transmits other information, such as, but not limited to, a current level from/to the H.V. Battery BT1 to the transmitting circuit. The Transmitting Section 215 can be a wireless device. The wireless device can be a dedicated wireless device for feedback to the transmitting circuit (not shown in FIG. 1). Alternatively, the wireless device can be a wireless device pre-existing in a vehicle for other purposes as well.

The transmitting circuit includes an inverter (not shown in FIG. 1), which controls the inductor (transmitting coil) of the wireless power transfer system. The amount of power sent from the transmitting circuit is adjusted based on the feedback. An example of the transmitting circuit will be described later.

If the wireless power transfer system is charging a H.V. Battery BT1 of a vehicle such as a hybrid electric vehicle or an electric vehicle, the Control Module 50 can be part of the on-board control system. Alternatively, the Control Module 50 can be a dedicated control module for the wireless power transfer overvoltage protection system. Additionally, each of the functionalities described for the Control Module 50 can be separately implemented by multiple devices collectively being Control Module 50. For example, separate voltage sensors can be used to detect the state of charge of the H.V. Battery BT1 or the voltage across the filter capacitor C1.

Figure 2B:
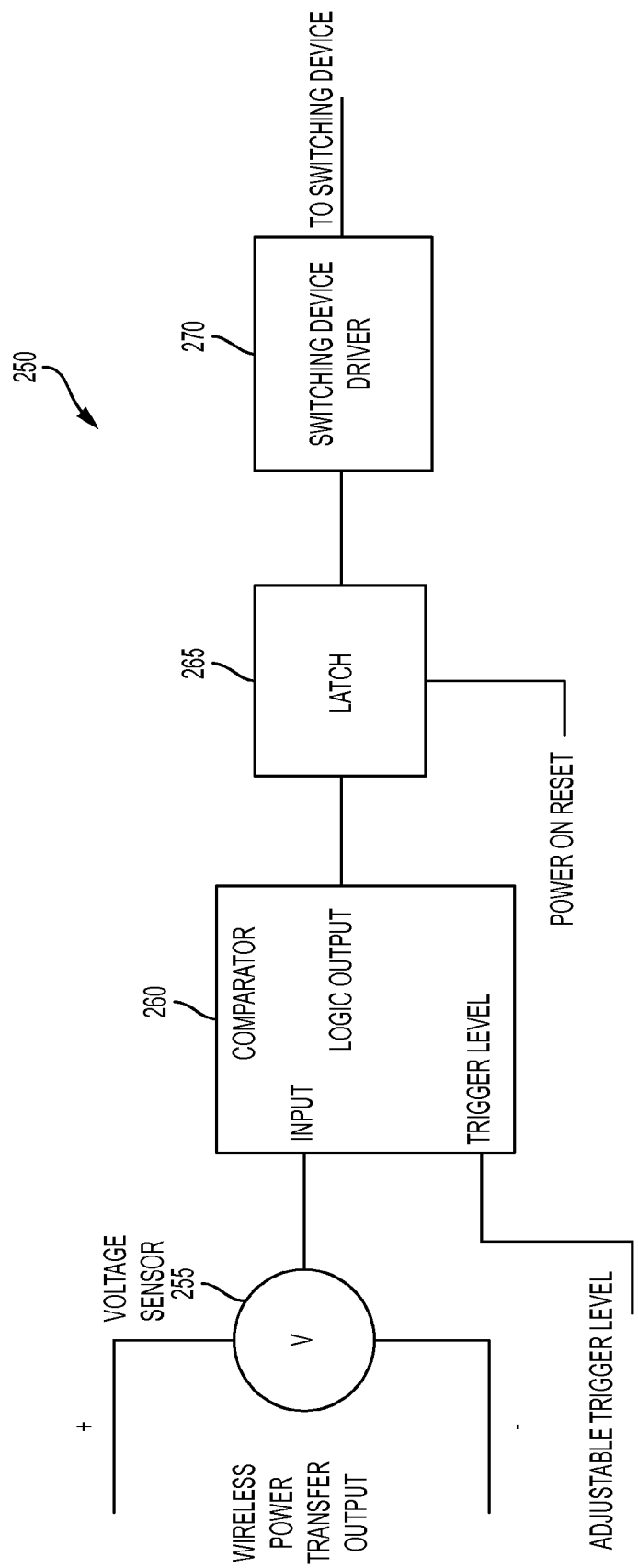
FIG. 2B illustrates a high level schematic of an example of a control circuit which can be used in a control module in accordance with aspects of the disclosure.

FIG. 2B illustrates a high level schematic of an example of a control circuit 250 which can be used in a Control Module 50 in accordance with aspects of the disclosure.

The Control Circuit 250 includes a Voltage Sensor 255. The Voltage Sensor 255 can be a voltmeter. The Voltage Sensor 255 is coupled to the both ends of the filter capacitor C1 and monitors the output of the wireless power transfer system. The coupling is shown in FIG. 1 as two lines respectively connected to the ends of the filter capacitor C1 and Control Module 50.

The sensed voltage by the Voltage Sensor 255 is input into a Comparator 260 (labeled as Input). The Comparator 260 compares the sensed voltage with a trigger level. The trigger level can be adjusted based on a level of protection desired. A lower trigger level will cause the switching device, e.g., K1 to short the inductor L1 earlier than a higher trigger level during charging. When overvoltage trigger level is reached, the Comparator 260 sets (logic output changes). A Latch 265 is coupled to the Comparator 260. The Latch 265 holds a state of the logic output so that the output doesn't oscillate. The state of the logic output is maintained in the Latch 265 until a power reset occurs, e.g., power on reset.

The Latch 265 is coupled to Switching Device Driver 270. The output of the Latch 265 proceeds to the Switching Device Driver 270. The Switching Device Driver 270 sets the output state so that the inductor L1 is shorted on overvoltage trip, e.g., when the sensor voltage is higher than the trigger level.

The Voltage Sensor 255 in conjunction with the Comparator 260 is an example of Voltage Monitor Section 210. The Latch 265 and Switching Device Driver 270 is an example of a Switch Control Section 200.

Other parameters can be used to control the state of the switch, such as current, State of the load, e.g., H.V. Battery BT1, temperature of the battery and Absolute Voltage of Battery. As used herein, the state of charge of the battery refers to the ratio of the energy stored in a battery ($Wh_x$) to the total (100% SOC) energy storage capacity of the battery ($Wh_{100}$). When other parameters are used, additional voltage or current sensors and corresponding Comparators can be added to the Control Circuit 250 in parallel. For example, FIG. 1 depicts two lines, respectively connected to the positive and negative terminals of the H.V. Battery BT1 and the Control Module 50. These connection represent monitoring points for the Control Module 50, e.g., monitoring the battery voltage.

In an aspect of the disclosure, an analog control circuit can be used as a Control Module 50 in combination with a microcontroller as the Control Module 50. This would provide redundancy. Each of the analog control circuit and microcontroller would act in parallel and independently monitor at least one switching parameter, e.g., voltage across the filter capacitor C1. The first Control Module to react to a trigger condition, e.g., a sensor voltage being than the trigger level, would control the switching device, e.g., relay K1, to short the inductor L1.

Figure 3:
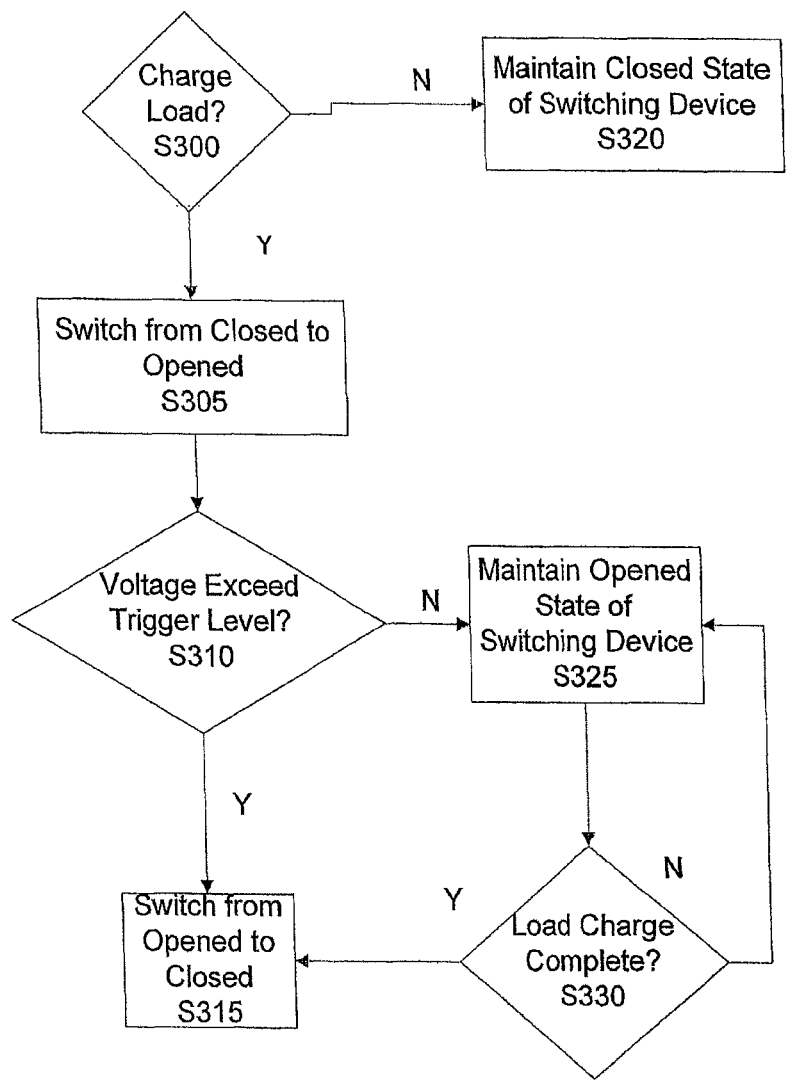
FIG. 3 illustrates an example of a method for controlling the switching device in accordance with aspects of the disclosure.

FIG. 3 illustrates an example of a method for controlling the switching device, e.g., relay K1, in accordance with aspects of the disclosure. FIG. 3 is described with respect to the sections described in FIG. 2A. However, as described above, the Control Circuit 250 is an example, of a Switch Control Section 200 and a Voltage Monitoring Section 210 and the circuit elements depicted in FIG. 2B can implement the associated functions described for the same.

At S300, the Charge Detection Section 205 determines if the load, e.g., H.V. Battery BT1, is to be charged. The determination can be based on the voltage of the H.V. Battery BT1 or the SOC of the H.V. Battery BT1. Additionally, this determination can be based on a instruction received from an external on-board control device.

If ("N" at S300), the switching device is maintained in a closed state at S320. The Switch Control Section 200 keeps the switching signal input to the switching device constant. The inductor L1 is maintained is a short circuit state.

If ("Y" at S300), the switching device is switched from a closed state to an opened state. The Switch Control Section 200 changes the switching signal input to the switching device. Thus, the resonant circuit 10 is capable of resonating.

At S310, the Voltage Monitoring Section 210 monitors the DC voltage level on the filter capacitor C1. If the monitored DC voltage level is higher than a preset trigger level (also describes as a preset threshold) ("Y" at S310), e.g., an overvoltage condition is observed, the switching device is switched from an opened state to a closed state. The Switch Control Section 200 changes the switching signal input to the switching device. The inductor L1 is placed in a short circuit state. As depicted in FIG. 1, the relay K1 protects the filter capacitor C1 and the full wave bridge rectifier 20 by shorting out the inductor L1. Since the inductor L1 is placed in a short circuit state, the power induced in the resonant circuit 20 is dramatically reduced because the circuit is no longer tuned to the same resonant frequency. Additionally, the short circuit across the inductor L1 drops the voltage that is developed from the magnetic field down to a minimal level, e.g., proportional to the short circuit current of the inductor L1.

The short circuit across the inductor L1 also protects the resonant capacitor C2. This is because the voltages downstream of the switching device, e.g., relay K1, are limited. While the relay K1 is closed, e.g., the short circuit across the inductor L1, bleed off resistor R1 provides a way to bleed off or reduce the voltage across the filter capacitor C1.

If the wireless power transfer system is a closed loop system, when the switching device is switched from an opened state to a closed state, the Transmitting Section 215 transmits the detected DC voltage level to the transmitting side of the wireless power transfer system.

If monitored DC voltage level is not higher than the preset trigger level ("N" at S310), the switching device is maintained in an opened state, e.g., relay K1 continues to be opened at S325. The Switch Control Section 200 keeps the switching signal input to the switching device constant. Thus, the resonant circuit 10 is capable of resonating.

Additionally, the Control Module 50 can determine if the charging of the load, e.g., H.V. Battery BT1, is complete. For example, the State of Charge (SOC) of the H.V. Battery BT1 can be compared with a preset charge threshold. The preset charge threshold can be adjusted. The preset charge threshold is dependent on the type of H.V. Battery BT1 and/or the nature of the device or vehicle. Typically, the preset charge threshold will be greater than 90%. In an aspect of the disclosure, the preset charge threshold is set to below 100% to avoid overcharging the H.V. Battery BT1.

When the SOC is higher than the preset charge threshold, the Control Module 50 determines that the charge of the load, e.g., H.V. Battery BT1, is complete. If complete ("Y" at S330), the switching device is switched from opened to closed at S315. The Switch Control Section 200 changes the switching signal input to the switching device. The inductor L1 is placed in a short circuit state.

When the wireless power transfer system is a closed loop system, the Transmitting Section 215 transmits a signal to the transmitting circuit, such as a inverter shutdown signal and the inverter is shut off.

If the charging of the load, e.g., H.V. Battery BT1 is not complete ("N" at S330), the switching device, e.g., relay K1, is maintained in an opened state at S325. The Switch Control Section 200 keeps the switching signal input to the switching device constant. Thus, the resonant circuit 10 is capable of resonating.

Figure 4:
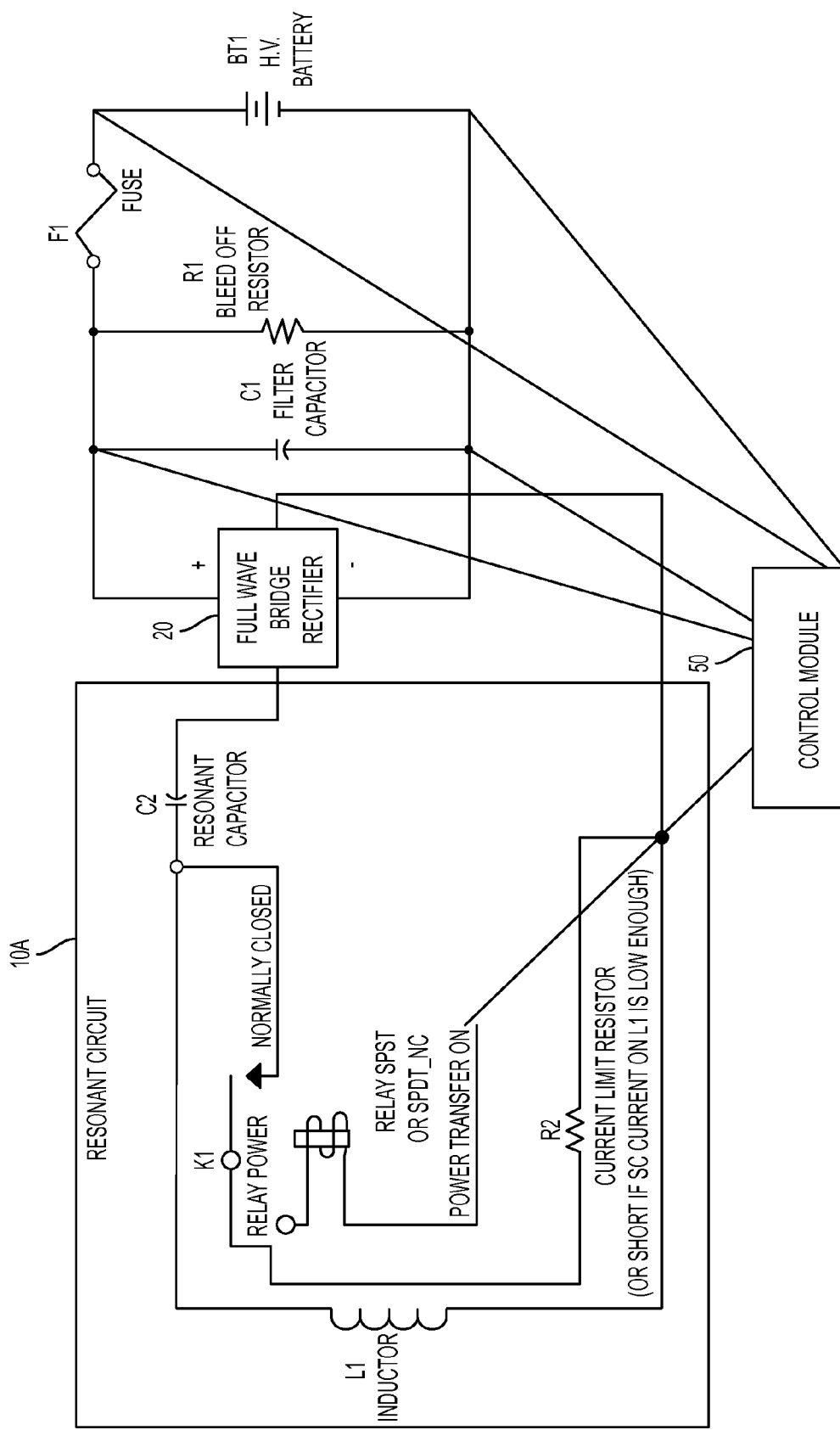
FIG. 4 illustrates another example of a wireless power transfer overvoltage protection system in accordance with aspects of the disclosure.

FIG. 4 illustrates another example of a wireless power transfer overvoltage protection system in accordance with aspects of the disclosure. The difference between the wireless power transfer overvoltage protection system depicted in FIG. 4 from the wireless power transfer overvoltage protection system depicted in FIG. 1 is that the resonant capacitor C2 is in series with the inductor L1 in the resonant circuit 10A as opposed to parallel. Thus, the relay K1 is not connected across the resonant capacitor C2 as in FIG. 1. The remaining components are the same and therefore will not be described again.

Figure 5:
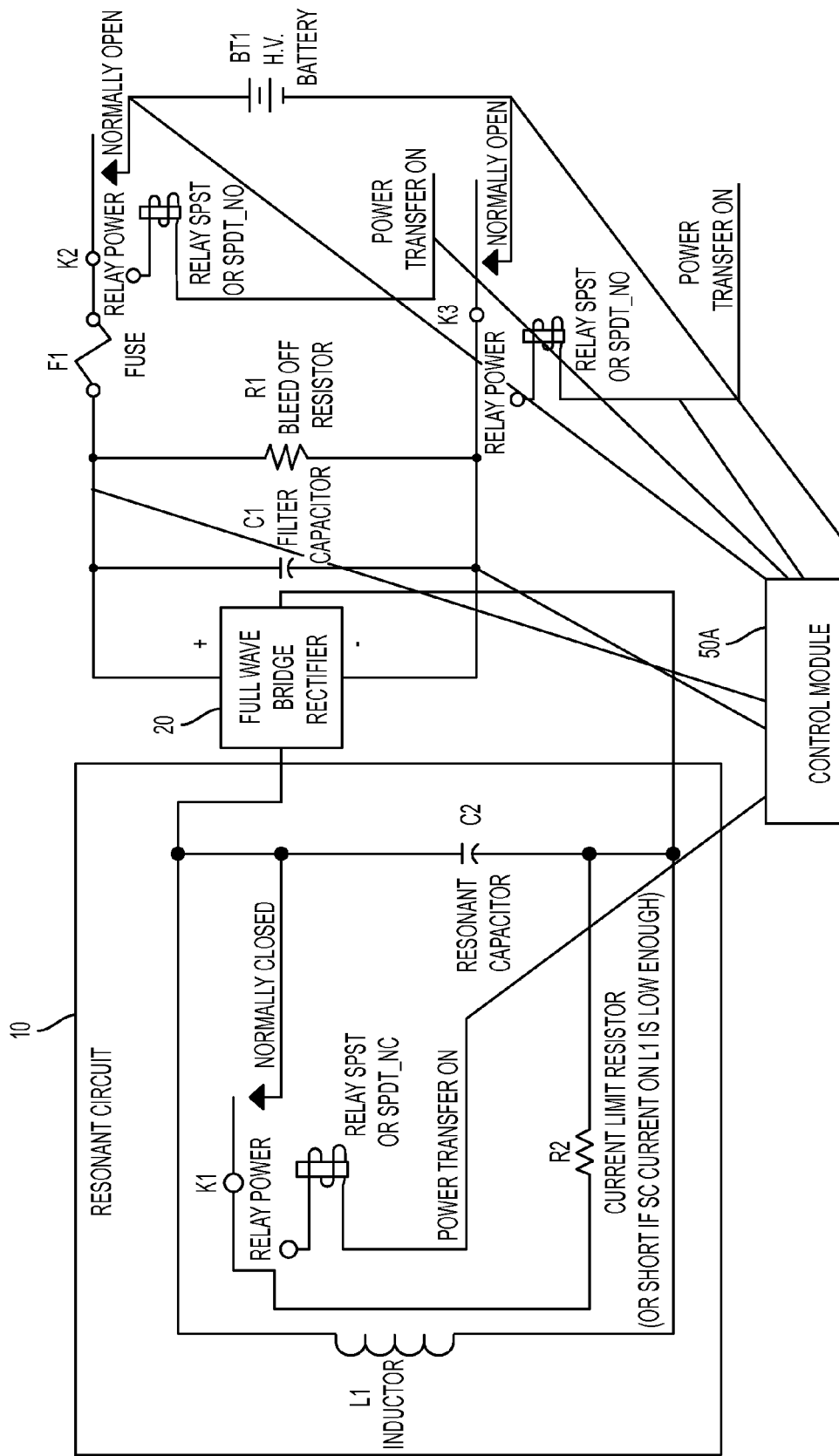
FIG. 5 illustrates another example of a wireless power transfer overvoltage protection system in accordance with aspects of the disclosure.

FIG. 5 illustrates another example of a wireless power transfer overvoltage protection system in accordance with aspects of the disclosure. The difference between the wireless power transfer overvoltage protection system depicted in FIG. 5 from the wireless power transfer overvoltage protection system depicted in FIG. 1 is that two additional switching devices, e.g., relays K2 and K3, are added in FIG. 5. Similar to relay K1, relays K2 and K3 can be, but are not limited to a SPST relay or a SPDT relay.

Relay K2 is connected between the Fuse F1 and one of the terminals of the load (e.g., BT1). Relay K3 is connected to the other of the terminals of the load. As depicted in FIG. 5, the respective terminals of the load are connected to the normally opened contact of the respective Relays K2 and K3 (SPST relay). If the relays K2 and K3 are SPDT relays, the respective terminals are connected to the normally opened contact (as opposed to the normally closed contact). The only time that the relays K2 and K3 are closed is during charging of the load, e.g., H.V. Battery BT1 (and when no overvoltage condition is detected).

Control Module 50A is similar to the Control Module 50 described above. In addition to being electrically coupled with relay K1, the Control Module 50A is also electrically coupled with relays K2 and K3. The Control Module 50A is configured to control the switching of the three switching devices, e.g., relays K1-K3.

The remaining components in FIG. 5 are the same as FIG. 1 and therefore will not be described again.

Figure 6:
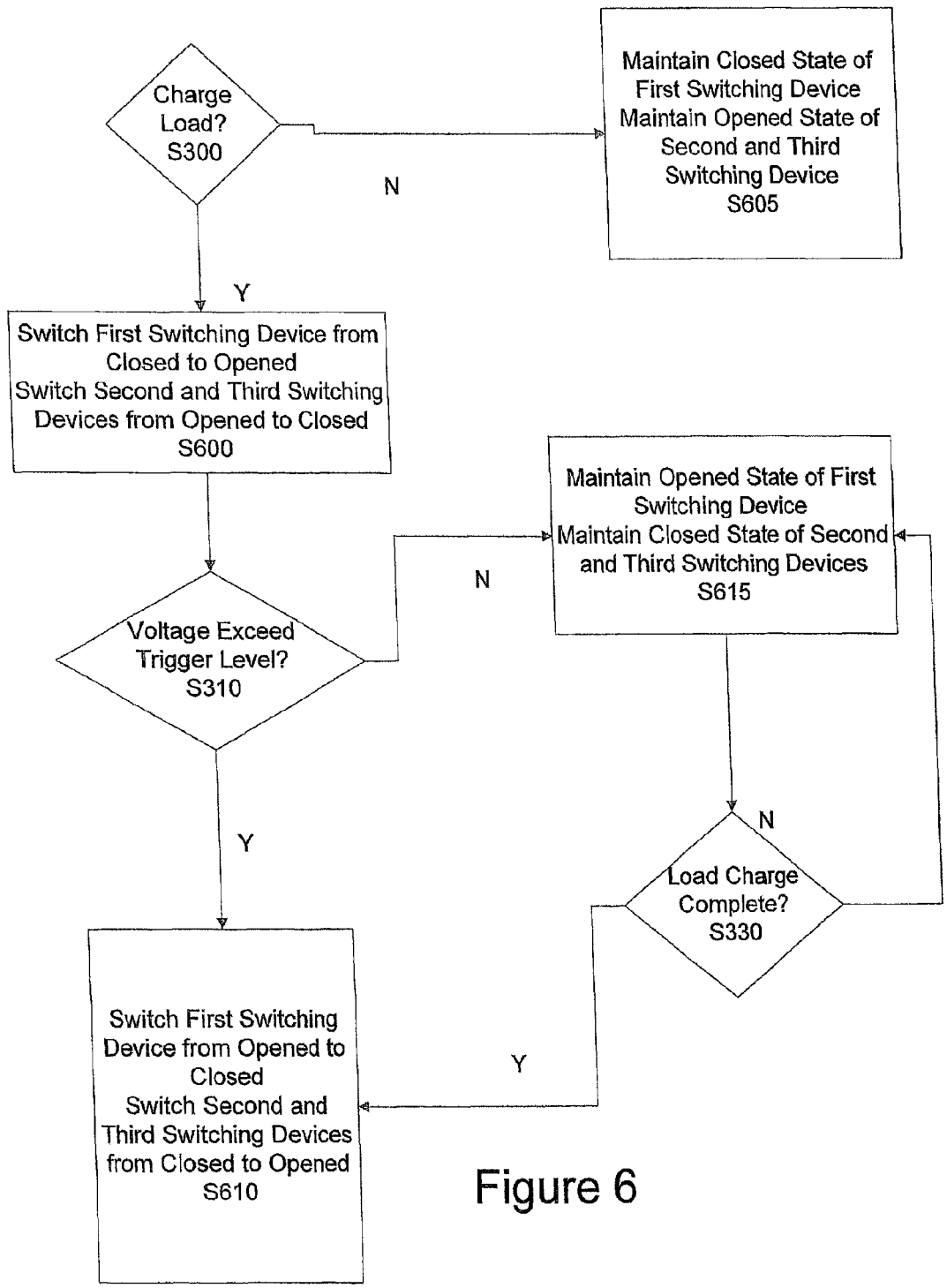
FIG. 6 illustrates an example method for controlling the three switching devices in accordance with aspects of the disclosure.

FIG. 6 illustrates an example of a method for controlling the switching devices e.g., relay K1-K3, in accordance with aspects of the disclosure. For purpose of the description relay K1 is referred to as the first switching device, relay K2 is referred to as the second switching device and relay K3 is referred to as the third switching device when describing FIGS. 5-7.

At S300, the Charge Detection Section 205 determines if the load, e.g., H.V. Battery BT1, is to be charged. If ("N" at S300), the first switching device is maintained in a closed state at S605. Additionally, the second switching device and the third switching device is maintained in an open state. The Switch Control Section 200 keeps the switching signal input to the switching devices constant. The inductor L1 is maintained is a short circuit state. The load, e.g., H.V. Battery BT1, is isolated from the resonant circuit 10.

If ("Y" at S300), the first switching device is switched from a closed state to an opened state (S600). The Switch Control Section 200 changes the switching signal input to the first switching device. Thus, the resonant circuit 10 is capable of resonating. The second switching device and the third switching device are switched from an opened state to a closed state (S600). The load is coupled to the resonant circuit 10. Thus, the H.V. Battery BT1 can be charged.

At S310, the Voltage Monitoring Section 210 monitors the DC voltage level on the filter capacitor C1. If the monitored DC voltage level is higher than a preset threshold ("Y" at S310), e.g., an overvoltage condition is observed, the first switching device is switched from an opened state to a closed state (S610). The Switch Control Section 200 changes the switching signal input to the first switching device. The inductor L1 is placed in a short circuit state. As depicted in FIG. 5, the relay K1 (the first switching device) protects the filter capacitor C1 and the full wave bridge rectifier 20 by shorting out the inductor L1. Since the inductor L1 is placed in a short circuit state, the power induced in the resonant circuit 20 is dramatically reduced because the circuit is no longer tuned to the same resonant frequency. Additionally, the short circuit across the inductor L1 drops the voltage that is developed from the magnetic field down to a minimal level, e.g., proportional to the short circuit current of the inductor L1. The short circuit across the inductor L1 also protects the resonant capacitor C2. This is because the voltages downstream of the first switching device are limited. While the first switching device is closed, e.g., the short circuit across the inductor L1, bleed off resistor R1 provides a way to bleed off or reduce the voltage across the filter capacitor C1. Additionally, the second switching device and the third switching device are switched from a closed state to an opened state. The Switch Control Section 200 changes the switching signals input to the second switching device and the third switching device. The load, e.g., H.V. Battery BT1, is isolated from the resonant circuit 10.

When the switching devices are switched to isolate the load and to short circuit the inductor L1, the transmitting Section 215 transmits the detected DC voltage level to the transmitting side of a wireless power transfer system. The transmission of the DC voltage level can be communicated using a wireless communication device (not shown).

If the monitored DC voltage level is not higher than the preset threshold ("N" at S310), the first switching device is maintained is an opened state (S615). The Switch Control Section 200 keeps the switching signal input to the first switching device constant. Thus, the resonant circuit 10 is capable of resonating. The second switching device and the third switching devices are maintained in a closed state (S615). The Switch Control Section 200 keeps the switching signals input to the second switching device and the third switching device constant.

Additionally, the Control Module 50A can determine if the charging of the load, e.g., H.V. Battery BT1, is complete. For example, the SOC of the H.V. Battery BT1 can be compared with a preset charge threshold. When the SOC is higher than the preset charge threshold, the Control Module 50A determines that the charge of the load, e.g., H.V. Battery BT1, is complete. If complete ("Y" at S330), the first switching device is switched from opened to closed at S610. The Switch Control Section 200 changes the switching signal input to the switching device. The inductor L1 is placed in a short circuit state. Additionally, the second switching device and the third switching device are switched from a closed state to an opened state (S610). The Switch Control Section 200 changes the switching signals input to the second switching device and the third switching device. The load, e.g., H.V. Battery BT1, is isolated from the resonant circuit 10 and is no longer receiving a charge.

If the charging of the load, e.g., H.V. Battery BT1, is not complete ("N" at S330), the first switching device is maintained in an opened state at S615. The Switch Control Section 200 keeps the switching signal input to the switching device constant. Thus, the resonant circuit 10 is capable of resonating. The second switching device and the third switching devices are maintained in a closed state (S615). The Switch Control Section 200 keeps the switching signals input to the second switching device and the third switching device constant.

Figure 7:
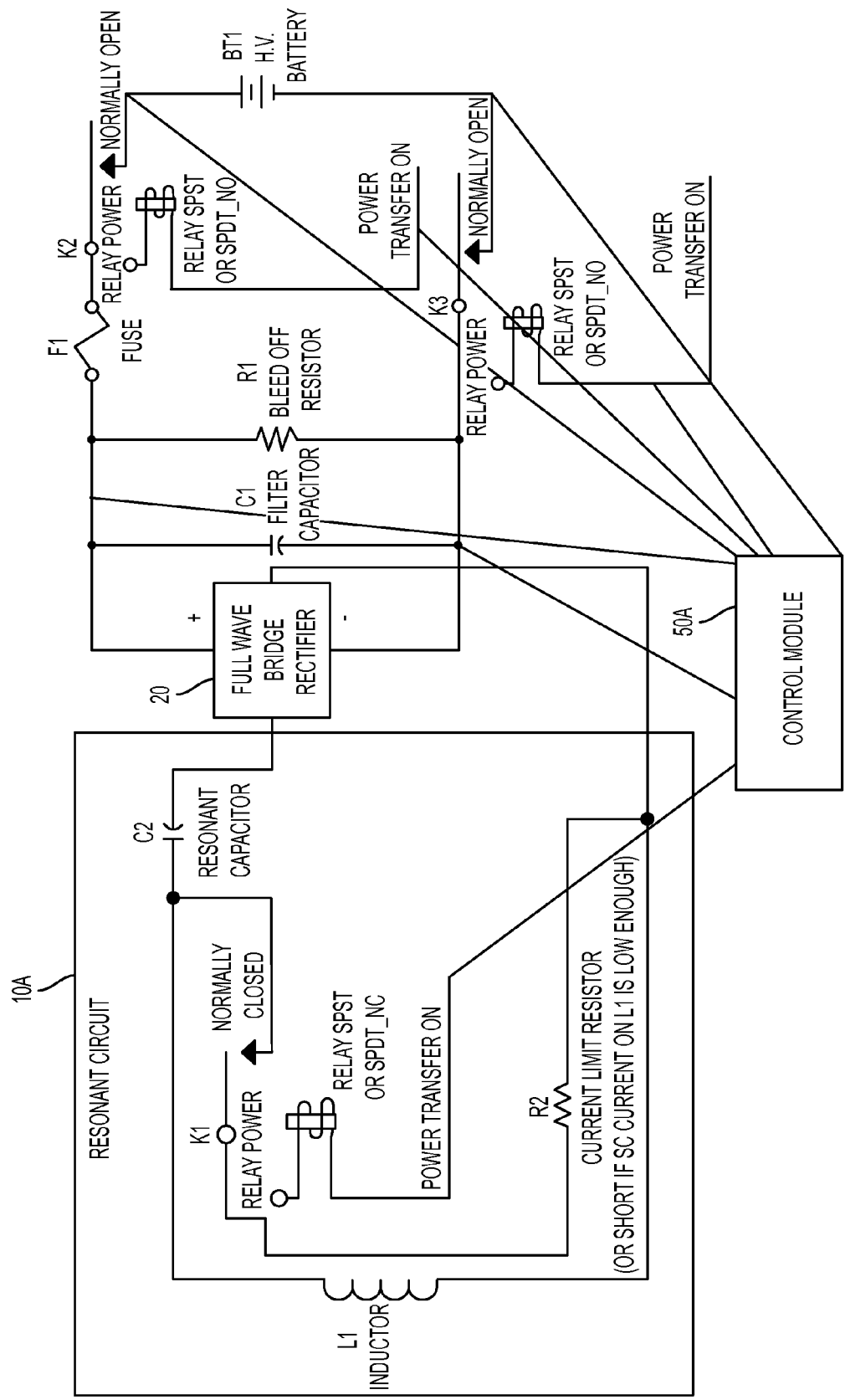
FIG. 7 illustrates another example wireless power transfer overvoltage protection system in accordance with aspects of the disclosure.

FIG. 7 illustrates another example of a wireless power transfer overvoltage protection system in accordance with aspects of the disclosure. The difference between the wireless power transfer overvoltage protection system depicted in FIG. 7 from the wireless power transfer overvoltage protection system depicted in FIG. 5 is that the resonant capacitor C2 is in series with the inductor L1 in the resonant circuit 10A as opposed to parallel. Thus, the relay K1 is not connected across the resonant capacitor C2 as in FIG. 5. The remaining components are the same and therefore will not be described again.

Figure 8:
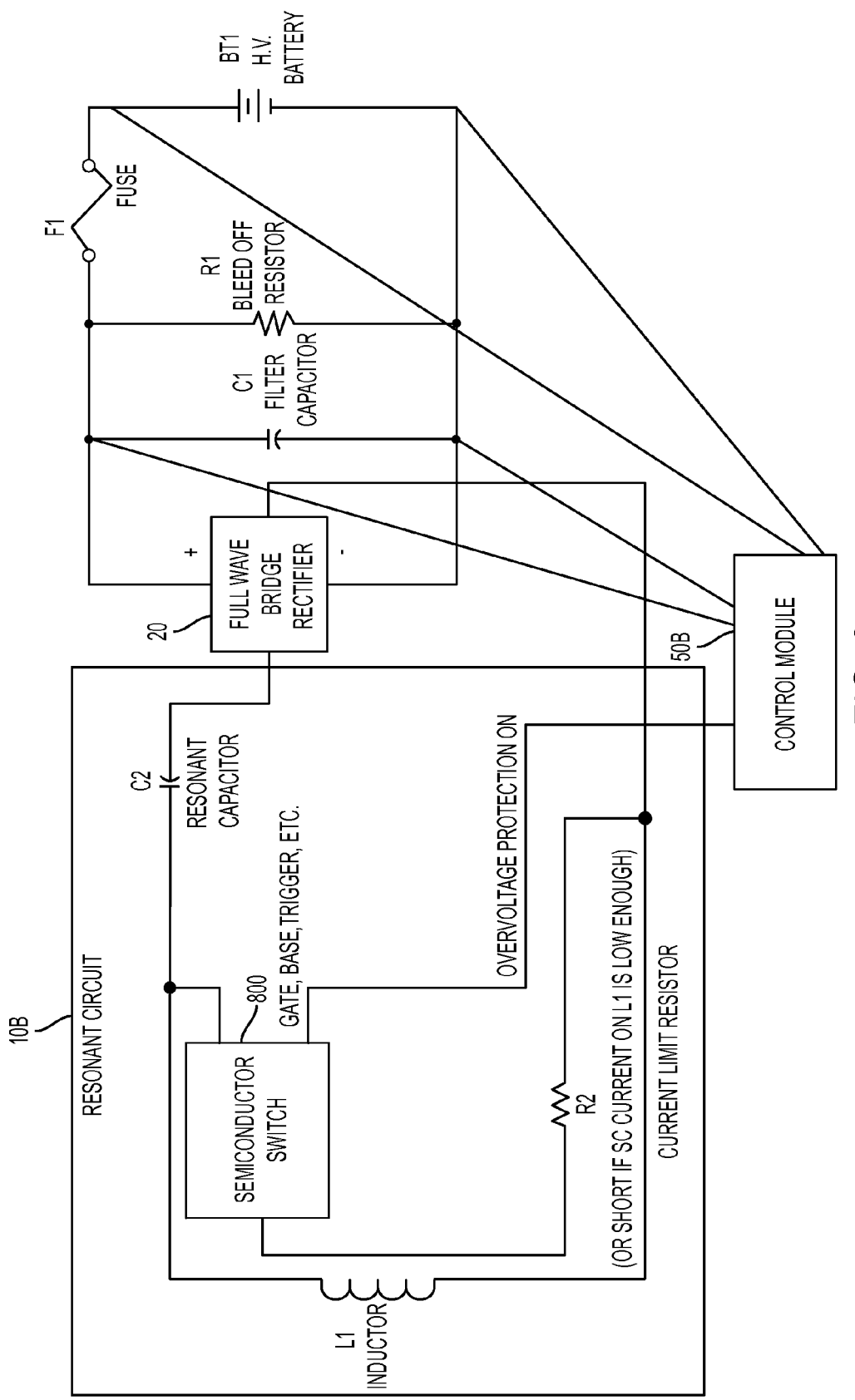
FIG. 8 illustrates another example wireless power transfer overvoltage protection system Switch in accordance with aspects of the disclosure.

As noted above, the switching device can be a semiconductor device. FIG. 8 illustrates another example of a wireless power transfer overvoltage protection system in accordance with aspects of the disclosure where the switching device is a semiconductor device.

As depicted in FIG. 8, a semiconductor switch 800 is used instead of a relay K1, as shown in FIGS. 1, 4, 5 and 7. The semiconductor switch 800 will provide a higher speed turn off by clamping the inductor L1 faster than the relay, if higher speed is needed. The semiconductor device is operated in its switching mode. The semiconductor device can be, but is not limited to, a Metal Oxide Semiconductor Field Effect Transistor (MOSFET), an Insulated-Gate Bipolar Transistor (IGBT), Bipolar Junction transistor (BJT) and Triac. The switching signal, e.g., Overvoltage Protection On signal is output from the Control Module 50 into the either the gate, base or trigger terminal of the semiconductor switch. In order to provide the overvoltage protection, the semiconductor switch 800 is normally maintained switch in an ON state. In other words, power is normally supplied to the above terminal of the semiconductor switch. When the semiconductor switch 800 is ON, the ends of the inductor L1 is coupled together through the semiconductor switch 800, and thus the inductor L1 is effectively shorted.

When the semiconductor switch 800 is OFF, the resonant circuit 10B is capable of resonating. Thus, the switching signal has two levels: a first level equal where a bias signal is provided to a terminal of the semiconductor switch 800 to bias the switch ON and a second level where no bias signal is supplied. Changing the level of the switching signal causes the semiconductor switch to turn ON or OFF.

As depicted in FIG. 8, the inductor L1 and resonant capacitor C2 are connected in series as a series resonant circuit, e.g., connected in a similar manner as depicted in FIG. 4, however, the inductor L1 and resonant capacitor C2 can be connected in parallel as a parallel resonant circuit, e.g., connected in a similar manner as depicted in FIG. 1. The location of the semiconductor switch 800 would be in a similar position within the circuit as the relay K1 in FIG. 1. The semiconductor switch 800 would be in parallel with both the inductor L1 and the resonant capacitor C2.

The semiconductor switch would be in parallel with the L1 inductor in all cases, replacing the relay/contactor.

Figure 9:
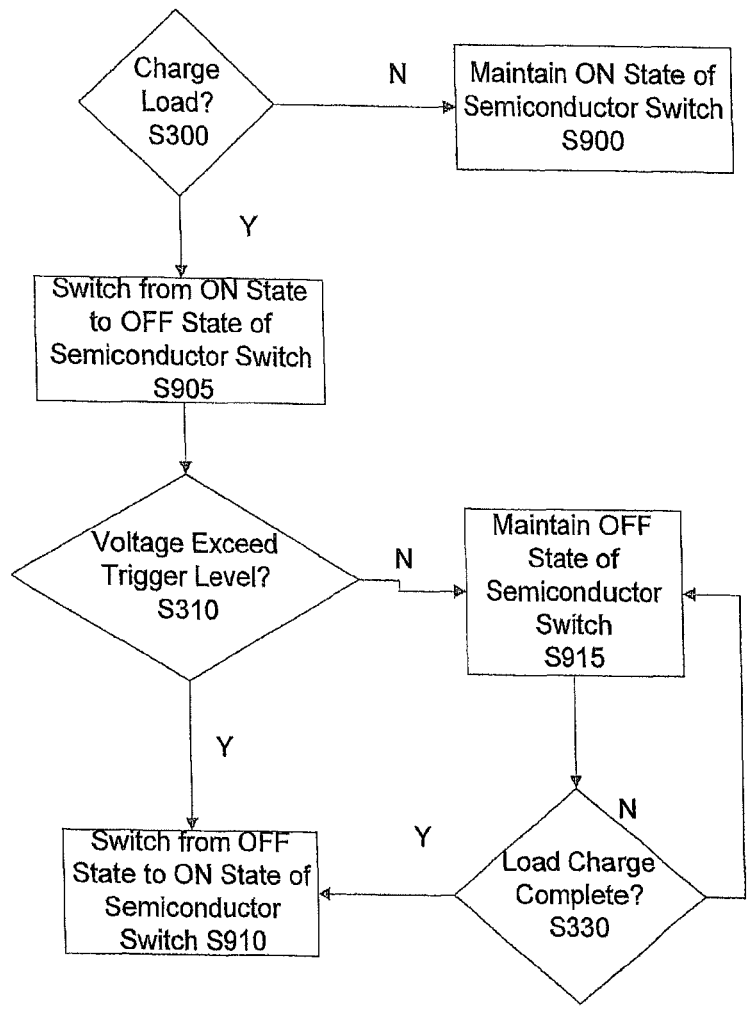
FIG. 9 illustrates an example of a method for controlling a Semiconductor Switch in accordance with aspects of the disclosure.

FIG. 9 illustrates an example of a method for controlling the Semiconductor Switch 800, in accordance with aspects of the disclosure. FIG. 9 is described with respect to the sections described in FIG. 2A. However, as described above, the Control Circuit 250 is an example, of a Switch Control Section 200 and a Voltage Monitoring Section 210 and the circuit elements depicted in FIG. 2B can implement the associated functions described for the same.

At S300, the Charge Detection Section 205 determines if the load, e.g., H.V. Battery BT1, is to be charged. The determination can be based on the voltage of the H.V. Battery BT1 or the SOC of the H.V. Battery BT1 battery. Additionally, this determination can be based on a instruction received from an external on-board control device.

If ("N" at S300), the Semiconductor Switch 800 is maintained in a ON state at S900. The Switch Control Section 200 keeps the switching signal input to the Semiconductor Switch 800 constant, e.g., bias ON. The inductor L1 is maintained is a short circuit state.

If ("Y" at S300), the Semiconductor Switch 800 is switched from an ON State to an OFF State (Step 905). The Switch Control Section 200 changes the switching signal input to the Semiconductor Switch 800 to turn the switch OFF. Thus, the resonant circuit 10 is capable of resonating.

At S310, the Voltage Monitoring Section 210 monitors the DC voltage level on the filter capacitor C1. If the monitored DC voltage level is higher than a preset trigger level (also describes as a preset threshold) ("Y" at S310), e.g., an overvoltage condition is observed, the Semiconductor Switch 800 is switched from an OFF state to a ON state at S910. The Switch Control Section 200 changes the switching signal input to the Semiconductor Switch 800 to bias the device ON. The inductor L1 is placed in a short circuit state. As depicted in FIG. 8, the Semiconductor Switch 800 protects the filter capacitor C1 and the full wave bridge rectifier 20 by shorting out the inductor L1. Since the inductor L1 is placed in a short circuit state, the power induced in the resonant circuit 20 is dramatically reduced because the circuit is no longer tuned to the same resonant frequency. Additionally, the short circuit across the inductor L1 drops the voltage that is developed from the magnetic field down to a minimal level, e.g., proportional to the short circuit current of the inductor L1.

The short circuit across the inductor L1 also protects the resonant capacitor C2. This is because the voltages downstream of the Semiconductor Switch 800 are limited. While the Semiconductor Switch 800 is in an ON State, e.g., the short circuit across the inductor L1, bleed off resistor R1 provides a way to bleed off or reduce the voltage across the filter capacitor C1.

If the wireless power transfer system is a closed loop system, when the Semiconductor Switch 800 is switched from an OFF state to a ON state, the Transmitting Section 215 transmits the detected DC voltage level to the transmitting side of the wireless power transfer system.

If the monitored DC voltage level is not higher than the preset trigger level ("N" at S310), the Semiconductor Switch 800 is maintained in an OFF state (S915). The Switch Control Section 200 keeps the switching signal input to the Semiconductor Switch 800 constant, e.g., no bias voltage is applied to a terminal of the Semiconductor Switch. Thus, the resonant circuit 10 is capable of resonating.

Additionally, the Control Module 50 can determine if the charging of the load, e.g., H.V. Battery BT1, is complete. For example, the State of Charge (SOC) of the H.V. Battery BT1 can be compared with a preset charge threshold. The preset charge threshold can be adjusted. Typically, the preset charge threshold will be greater than 90%. In an aspect of the disclosure, the preset charge threshold is set to below 100% to avoid overcharging the H.V. Battery BT1.

When the SOC is higher than the preset charge threshold, the Control Module 50 determines that the charge of the load, e.g., H.V. Battery BT1, is complete. If complete ("Y" at S330), the Semiconductor Switch 800 is switched from an OFF State to an ON State at S910. The Switch Control Section 200 changes the switching signal input to the Semiconductor Switch 800, e.g., provides a bias voltage to a terminal of the Semiconductor Switch 800. The inductor L1 is placed in a short circuit state.

When the wireless power transfer system is a closed loop system, the Transmitting Section 215 transmits a signal to the transmitting circuit, such as a inverter shutdown signal and the inverter is shut off.

If the charging of the load, e.g., H.V. Battery BT1 is not complete ("N" at S330), the Semiconductor Switch 800 is maintained in an OFF state at S915. The Switch Control Section 200 keeps the switching signal input to the Semiconductor Switch 800 constant, e.g., no bias voltage is applied to a terminal of the Semiconductor Switch 800. Thus, the resonant circuit 10 is capable of resonating.

While FIG. 8 only depicts a Semiconductor Switch 800 within the Resonant Circuit 10B, Semiconductor Switches can also be used to isolate the load, e.g., H.V. Battery BT1, in a similar manner as Relays K2 and K3 depicted in FIGS. 5 and 7, respectively.

The Semiconductor Switches would normally be in an OFF state, isolating the load, e.g., H.V. Battery BT1 from the rest of the wireless power transfer circuit. The Semiconductor Switches would only switch to an ON State to connect the load, e.g., H.V. Battery BT1, when the battery is charging (and when no overvoltage condition is detected).

A similar Control Module as Control Module 50A can be used to control the switching of the three Semiconductor Switches. For example, In addition to being electrically coupled with Semiconductor Switch 800, the Control Module, e.g., Control Module 50A can also be electrically coupled with the isolation Semiconductor Switches (not shown in FIG. 8).

Figure 10:
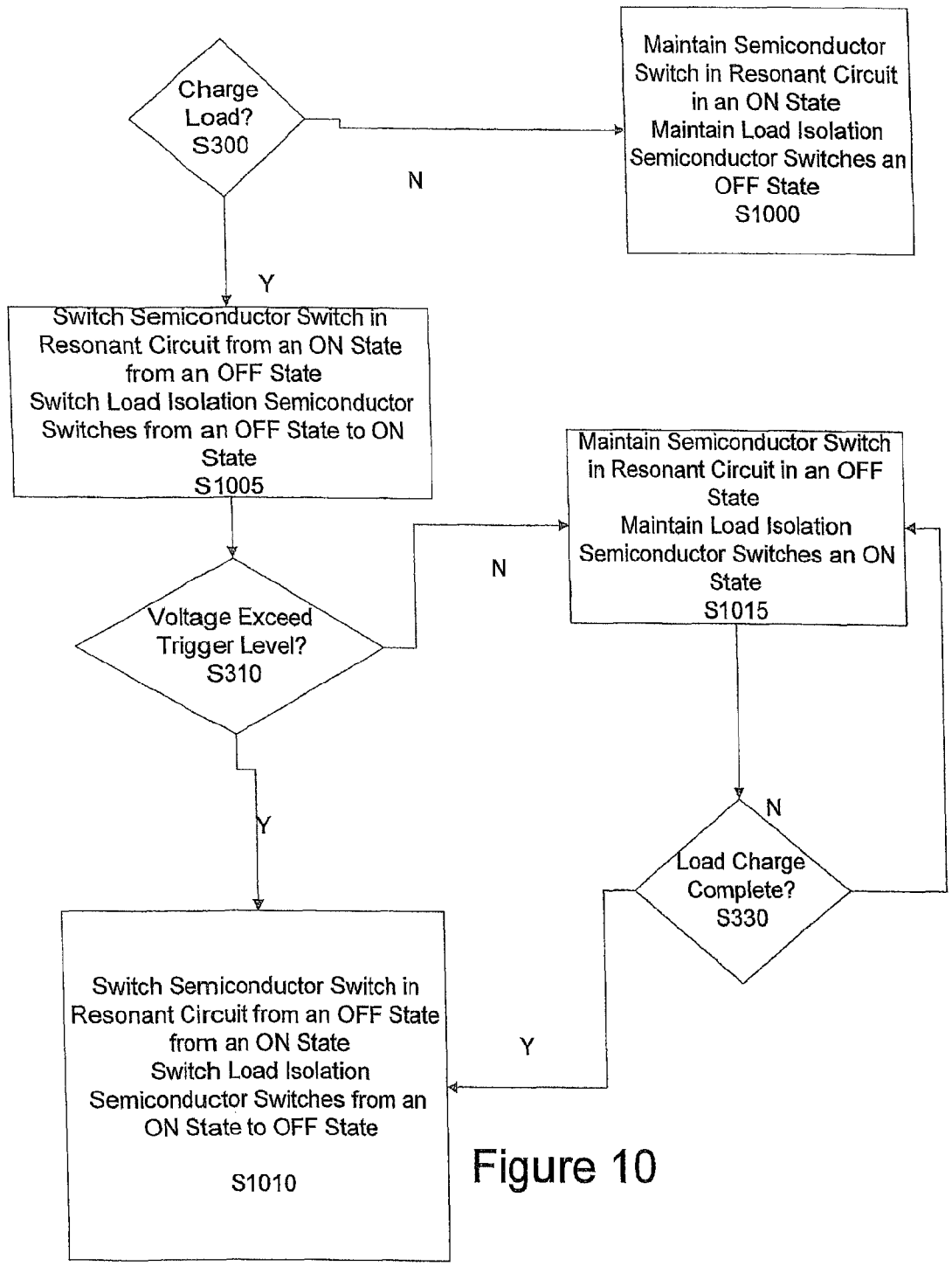
FIG. 10 illustrates an example of a method for controlling three Semiconductor Switches in accordance with aspects of the disclosure.

FIG. 10 illustrates an example of a method for controlling the Semiconductor Switch 800 in the resonant circuit 10B and the two load isolation Semiconductor Switches (not shown in FIG. 8 in accordance with aspects of the disclosure.

At S300, the Charge Detection Section 205 determines if the load, e.g., H.V. Battery BT1, is to be charged. If ("N" at S300), the Semiconductor Switch 800 in the resonant circuit 10B is maintained in a ON state at S1000, e.g., a bias voltage is supplied to a terminal of the Semiconductor Switch 800, such as a gate. Additionally, the two load isolation Semiconductor switches are maintained in an OFF state, e.g., a bias voltage is not supplied to the terminal of the respective Semiconductor Switches (S1000). The Switch Control Section 200 keeps the switching signal input to the switching devices constant. The inductor L1 is maintained is a short circuit state. The load, e.g., H.V. Battery BT1, is isolated from the resonant circuit 10B.

If ("Y" at S300), the Semiconductor Switch 800 in the resonant circuit 10B is switched from a ON state to an OFF state (S1005). The Switch Control Section 200 changes the switching signal input to the Semiconductor Switch 800 in the resonant circuit 10B, e.g., the bias voltage is removed from the terminal of the Semiconductor Switch 800. Thus, the resonant circuit 10B is capable of resonating. The two load isolation Semiconductor Switches are switched from an OFF state to an ON state (S1005). The Switch Control Section 200 inputs a bias voltage to respective terminals of the load isolation Semiconductor Switches.

The load is coupled to the resonant circuit 10B. Thus, the H.V. Battery BT1 can be charged.

At S310, the Voltage Monitoring Section 210 monitors the DC voltage level on the filter capacitor C1. If the monitored DC voltage level is higher than a preset threshold ("Y" at S310), e.g., an overvoltage condition is observed, the Semiconductor Switch 800 in the resonant circuit 10B, is switched from a OFF state to a ON state (S1010). The Switch Control Section 200 changes the switching signal input to the Semiconductor Switch in the resonant circuit 10B, e.g., a bias voltage is supplied to a terminal of the Semiconductor Switch 800. The inductor L1 is placed in a short circuit state. As depicted in FIG. 8, the Semiconductor Switch in the resonant circuit 10B protects the filter capacitor and the full wave bridge rectifier 20 by shorting out the inductor L1. Since the inductor L1 is placed in a short circuit state, the power induced in the resonant circuit 20 is dramatically reduced because the circuit is no longer tuned to the same resonant frequency. Additionally, the short circuit across the inductor L1 drops the voltage that is developed from the magnetic field down to a minimal level, e.g., proportional to the short circuit current of the inductor L1.

The short circuit across the inductor L1 also protects the resonant capacitor C2. This is because the voltages downstream of the Semiconductor Switch in the resonant circuit 10B are limited. While the Semiconductor Switch in the resonant circuit 10B is in an ON state, e.g., the short circuit across the inductor L1, bleed off resistor R1 provides a way to bleed off or reduce the voltage across the filter capacitor C1.

Additionally, the load isolation Semiconductor Switches are switched from an ON state to an OFF state. The Switch Control Section 200 changes the switching signals input to the load isolation Semiconductor Switches, e.g., the bias voltage is removed from the respective terminals of the load isolation Semiconductor Switches. The load, e.g., H.V. Battery BT1, is isolated from the resonant circuit 10B.

When the Semiconductor Switches are switched to isolate the load and to short circuit the inductor L1, if the wireless power transfer system is a closed loop system, the transmitting Section 215 transmits the detected DC voltage level to the transmitting side of a wireless power transfer system. The transmission of the DC voltage level can be communicated using a wireless communication device (not shown).

If the monitored DC voltage level is not higher than the preset threshold ("N" at S310), Semiconductor Switch in the resonant circuit 10B is maintained is an OFF state (S1015). The Switch Control Section 200 keeps the switching signal input to the Semiconductor Switch in the resonant circuit 10B constant, e.g., no bias voltage is supplied to the terminal. Thus, the resonant circuit 10 is capable of resonating. The load isolation Semiconductor Switches are maintained in an ON state (S1015). The Switch Control Section 200 keeps the switching signals input to the load isolation Semiconductor Switches constant, e.g., a bias voltage is supplied to the respective terminals.

Additionally, the Control Module, e.g., Control Module 50A, can determine if the charging of the load, e.g., H.V. Battery BT1, is complete. For example, the SOC of the H.V. Battery BT1 can be compared with a preset charge threshold. When the SOC is higher than the preset charge threshold, the Control Module 50A determines that the charge of the load, e.g., H.V. Battery BT1, is complete. If complete ("Y" at S330), the Semiconductor Switch in the resonant circuit 10B is switched from OFF state to an ON closed at S1010. The Switch Control Section 200 changes the switching signal input to the Semiconductor Switch in the resonant circuit 10B, e.g., a bias voltage is supplied to the terminal of the Semiconductor Switch in the resonant circuit 10B. The inductor L1 is placed in a short circuit state. Additionally, the load isolation Semiconductor Switches are switched from an ON state to an OFF state (S1010). The Switch Control Section 200 changes the switching signals input to the load isolation Semiconductor Switches, e.g., removes the bias voltage from the respective terminals. The load, e.g., H.V. Battery BT1, is isolated from the resonant circuit 10B and is no longer receiving a charge.

If the charging of the load, e.g., H.V. Battery BT1, is not complete ("N" at S330), the Semiconductor Switch in the resonant circuit 10B is maintained in an OFF state at S1015. The Switch Control Section 200 keeps the switching signal input to the Semiconductor Switch in the resonant circuit 10B constant, e.g., no bias voltage is supplied to the terminal. Thus, the resonant circuit 10 is capable of resonating. The load isolation Semiconductor Switches are maintained in an ON state (S1015). The Switch Control Section 200 keeps the switching signals input to the load isolation Semiconductor Switches constant, e.g., supplies the bias voltage to the respective terminals.

The use of the term terminal of the semiconductor switches refers to the gate, base or trigger terminal of the semiconductor device.

Figure 11:
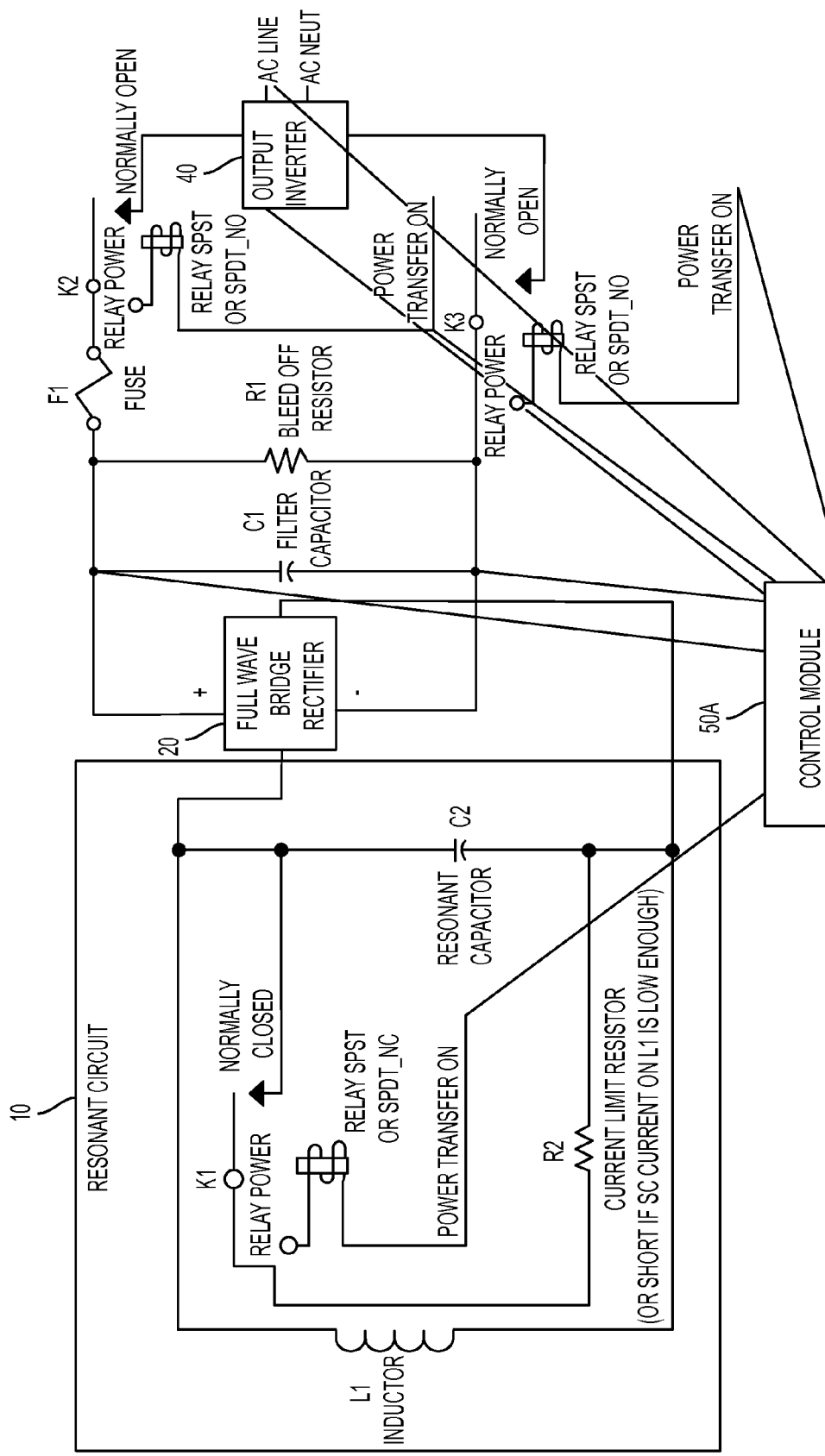
FIG. 11 shows another wireless power transfer overvoltage protection system in accordance with aspects of the disclosure where the load is an inverter.

FIG. 11 shows another wireless power transfer overvoltage protection system in accordance with aspects of the disclosure where the load is an inverter 40 instead of a H.V. battery. The configuration depicted in FIG. 11 is for a parallel resonant circuit 10 where the inductor L1 and the resonant capacitor C2 are in parallel. However, the wireless power transfer overvoltage protection system can be configured in a series resonant circuit 10A where the inductor L1 and resonant capacitor C2 are in series and the load is an output inverter 40. Additionally, the configuration depicted in FIG. 11 shows three switching devices, e.g., relays K1-K3, including two load isolation switching devices K2 and K3 for isolating the output inverter 40. However, an output inverter 40 can be coupled to a wireless power transfer overvoltage protection system without the two load isolation switching devices K2 and K3. Additionally, similar to where the load is a H.V. Battery BT1, one or more Semiconductor Switches can be used instead of the relays K1-K3 where the load is an output inverter 40.

In addition to monitoring the voltage across the filter capacitor C1, the Control Module 50A can monitor the AC line output from the Output Inverter 40.

The wireless power transfer overvoltage protection system can be used in a wireless power transfer system for charging a battery in a vehicle or any mobile device. The system can be used with any device that requires a battery to be charged, moves on its own or is tethered to another location where direct power connections are not present or feasible.

A vehicle may be a land-based, water-based and air-based. For example, a vehicle can be automobile, a shuttle, a trolley, a golf-type cart, a train, a forklift, or any other type of electrified vehicle. Additionally, the vehicle can be an autonomous underwater vehicle. Further, the vehicle can move on railing or cable. Further, the vehicle can be industrial vehicles or commercial vehicle such as construction vehicles.

The wireless power transfer system can be a stationary system or a dynamic on-road charging station. The wireless power transfer system can be open loop or a closed loop system. In a closed loop system, communication can be unidirectional or bi-directions. Communication can be wired or wireless. For example, a vehicle to infrastructure communication (V2I) can be used to transmit feedback signals, activation signal and vehicle location.

Figure 12:
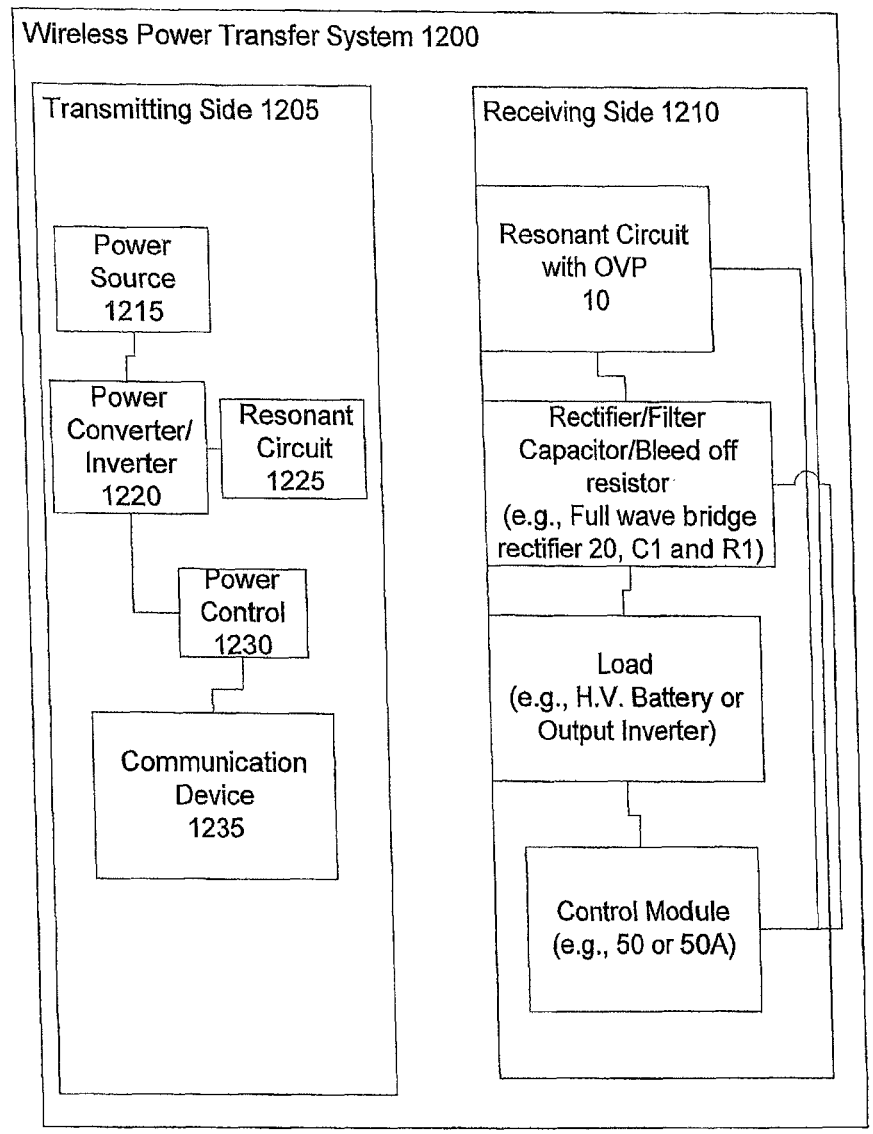
FIG. 12 illustrates an example of a wireless power transfer system with overvoltage protection in accordance with aspects of the disclosure.

FIG. 12 illustrates an example of a wireless power transfer system 1200 with overvoltage protection in accordance with aspects of the disclosure. FIG. 12 is a high level block diagram of the system. The wireless power transfer system 1200 includes a Transmitting Side 1205 and a Receiving Side 1210.

The Transmitting Side 1205 includes a Power Source 1215, a Power Converter/Inverter 1220, a Resonant Circuit 1225, a Power Control 1235 and a Communication Device 1235. The Power Source 125 is a DC power source. The Power Source 1215 can be a battery that provides a constant voltage across input nodes of the Power Converter/Inverter 1220. In another aspect of the disclosure, the Power Source 1215 can be configured to generate a constant voltage from an alternating current (AC) power supply that operates at a nominal frequency from 50 Hz to 60 Hz and at a nominal voltage from 110 V to 220V, e,g., an AC voltage available at residential buildings or industrial buildings. In another aspect of the disclosure, the nominal voltage can be higher.

The nominal voltage can depend on the power level needed to be transferred and the circuit components within the system.

The constant voltage generated from the AC power supply that operates at a frequency from 50 Hz to 60 Hz is provided to the input nodes of the Power Converter/Inverter 120.

The Power Converter/Inverter 1220 is configured to generate an AC waveform from the DC power supplied under the control of the Power Control 1230. The Power Converter/Inverter 1220 can employ any circuit that can generate a periodic waveform that mimics a sinusoidal waveform, for example, in a frequency range from 1 kHz to 1 MHz. The AC waveform is input to the Resonant Circuit 1225 which generated a magnetic field. The Resonant Circuit 1225 includes a transmitting coil (inductor and a resonant capacitor). The Resonant Circuit 1225 will resonate with a resonance frequency determined by the inductance and capacitance of the transmitting coil and resonant capacitor. The components of the Resonant Circuit 1225 can be selected such that the resonance frequency $f_0$ is from 1 kHz to 1 MHz, although the resonance frequency $f_0$ can be lower than 1 kHz or greater than 1 MHz in some embodiments. In an aspect of the disclosure, the resonance frequency $f_0$ can be within a range from 10 kHz to 150 kHz. The magnetic field generated by the Resonant Circuit 1225 will induce a current in the Resonant Circuit with Overvoltage protection in the Receiving Side (e.g., 10), e.g., a resonant magnetic coupling is provided between the two resonant circuits.

The Power Control 1230 is configured to control the duty cycle of the AC output voltage, a frequency of the AC output voltage, and a magnitude of the AC output voltage supplied to the Resonant Circuit 1225 by the Power Converter/Inverter 1220. In a closed loop system, the Power Control 1230 can adjust the rate of charge and the level of the AC voltage based on feedback received from the Receiving Side 1210 via the Communication Device 1235. In an aspect of the disclosure, the Communication Device 1235 is a wireless device.

The Receiving Side includes a Resonant Circuit with overvoltage protection. Any of the configurations described herein can be used for the Resonant Circuit with OVP on the receiving side. A Full wave bridge rectifier 10 and filter capacitor (C1) converts the alternating current induced in the Resonant Circuit into a direct current voltage, which is applied to the load. As previously noted, the load can be a H.V. Battery BT1 or a Output Inverter 40. The H.V. battery BT1 can be configured to provide a DC voltage, for example, in a range from 100 V to 1 kV. Optionally, a vehicles DC-DC converter can be employed to change ancillary loads within the vehicle such as, but not limited to, a 12V ancillary battery.

The Resonant Circuit 1225 can be located in any place that a vehicle can be placed proximately to. In an aspect of the disclosure, the Resonant Circuit 1225 can be located within a facility configured to park or store vehicles. In another aspect of the disclosure, the Resonant Circuit 1225 can be located underneath, or over, a road configured to allow vehicles to pass through. In yet another aspect of the disclosure, the Resonant Circuit 1225 can be located within a structure located on a side of a road configured to allow vehicles to pass through.

In an aspect of the disclosure, the Control Module can transmit the information to the Communication Device 1235 using a built-in Transmitting Section 215. Alternatively, the information can be routed via a on-board vehicle communication device.

In as aspect of the disclosure, a pre-charge circuit can be used to charge the filter capacitor C1 when a H.V. battery is being charged by the wireless power transfer system. The pre-charge circuit would charge the filter capacitor) to the same voltage level as the H.V. battery voltage level before switching on the load isolation switching device, such as relays K2 and K3 or load isolation Semiconductor Switches. Without pre-charge circuitry, the filter capacitor C1 will be at a lower voltage, or zero volts, when the wireless power transfer system is attached to the H.V battery.

If the filter capacitor C1 is at a much lower voltage level, the current will be excessive until equilibrium (possibly damaging the filter capacitors). The pre-charge circuit will charge the filter capacitor(s) through a fixed resistor, at a current the capacitor(s) can accept without damage until the H.V. Battery and filter capacitor voltage are equal. A small relay or semiconductor device can be used to switch the pre-charge circuitry on and off between the H.V. battery and the filter capacitor. After charging the capacitor, then the pre-charge is removed.

As described herein, the Control Module can be implemented in a microcontroller or microprocessor, or analog and digital control circuitry. The microcontroller or microprocessor comprises at least processor, at least one storage device, such as, but not limited to, RAM, ROM and persistent storage, and an external interface. The microprocessor may also include an input device to input various trigger levels such as a voltage threshold for the sensed voltage across the filter capacitor C1 and/or charging threshold for the SOC of the battery.

The processor is configured to execute one or more programs stored in a computer readable storage device. The computer readable storage device can be RAM, persistent storage or removable storage. For example, the processor can execute instructions in a program that may be loaded into RAM. The processor may include one or more processing units. The processor can be, but is not limited to, a CPU or a GPU.

In an aspect of the disclosure, the system can be operated without a microcontroller, with a pure analog and digital control.

A storage device is any piece of hardware that is capable of storing information, such as, for example without limitation, data, programs, instructions, program code, and/or other suitable information, either on a temporary basis and/or a permanent basis. In another aspect of the disclosure, the Control Module may include ASIC ASIC, FPGA, a PAL and PLA.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

While the disclosure has been described in terms of specific examples, it is evident in view of the foregoing description that numerous alternatives, modifications and variations will be apparent to those skilled in the art. Each of the examples described herein can be implemented individually or in combination with any other example unless expressly stated otherwise or clearly incompatible. Other suitable modifications and adaptations of a variety of conditions and parameters normally encountered in image processing, obvious to those skilled in the art, are within the scope of this disclosure. All publications, patents, and patent applications cited herein are incorporated by reference in their entirety for all purposes to the same extent as if each individual publication, patent, or patent application were specifically and individually indicated to be so incorporated by reference. Accordingly, the disclosure is intended to encompass all such alternatives, modifications and variations which fall within the scope and spirit of the disclosure and the following claims. The technology disclosed and claimed herein may be available for licensing in specific fields of use by the assignee of record.

What is claimed is:

1. A wireless power transfer overvoltage protection system comprising:
   a resonant receiving circuit comprising, an inductor, a resonant capacitor and a first switching device, the inductor having a first end and a second end, the first switching device being connected between the first end and the second end of the inductor, the resonant receiving circuit being connected to a rectifier and a filter capacitor, the first switching device having a first state in which the first end and the second end of the inductor are electrically coupled to each other through the first switching device, and a second state in which the inductor and resonant capacitor are capable of resonating; and
   a control module configured to control the first switching device to switching between the first state and the second state when the resonant receiving circuit is charging a load and a preset condition is satisfied and otherwise, the first switching device is maintained in the first state.

2. The wireless power transfer overvoltage protection system of claim 1, wherein the preset condition is a DC voltage level at the filter capacitor; and
   wherein the control module is further configured to monitor a DC voltage level at the filter capacitor and wherein when the monitored DC voltage level at the filter capacitor is higher than a voltage threshold, the control module is configured to control the first switching device to change from the second state to the first state to protect the filter capacitor and the rectifier.

3. The wireless power transfer overvoltage protection system of claim 1, wherein the resonant receiving circuit comprises a resistor connected in series with the first switching device.

4. The wireless power transfer overvoltage protection system of claim 1, wherein the first switching device is a relay.

5. The wireless power transfer overvoltage protection system of claim 4, wherein the relay is a single pole single throw relay, and wherein in the first state, the single pole single throw relay is closed.

6. The wireless power transfer overvoltage protection system of claim 4, wherein the relay is a single pole double throw relay, the single pole double throw relay having a normally closed contact, wherein the first end of the inductor is connected to the normally closed contact.

7. The wireless power transfer overvoltage protection system of claim 1, wherein the inductor and the resonant capacitor are connected in parallel, the resonant capacitor having a first end and a second end, the first switching device being connected between the first end and the second end of the resonant capacitor and wherein in the first state, the first end and the second end of the resonant capacitor are electrically coupled to each other through the first switching device.

8. The wireless power transfer overvoltage protection system of claim 7, wherein the first switching device protects the filter capacitor and the rectifier by shorting out the resonant capacitor when power to the first switching device is turned off by the control module.

9. The wireless power transfer overvoltage protection system of claim 1, wherein the first switching device is a switching semiconductor device.

10. The wireless power transfer overvoltage protection system of claim 1, wherein the load is a battery, and wherein the resonant receiving circuit is further connected to the battery via a second switching device and a third switching device and the control module is further configured to control the second switching device and the third switching device to protect the battery.

11. The wireless power transfer overvoltage protection system of claim 10, wherein the second switching device is a second relay and the third switching device is a third relay.

12. The wireless power transfer overvoltage protection system of claim 11, wherein the control module is configured to electrically isolate the battery from the resonant receiving circuit using the second relay and the third relay when a monitored DC voltage level is higher than a voltage threshold.

13. The wireless power transfer overvoltage protection system of claim 2, wherein the control module is further configured to communicate the monitored DC voltage level to an inverter that supplies power to the resonant receiving circuit.

14. The wireless power transfer overvoltage protection system of claim 1, wherein the load is a battery and the wherein the resonant receiving circuit is further connected to the battery via a second switching device, a third switching device and a bleed off resistor.

15. The wireless power transfer overvoltage protection system of claim 1, wherein the preset condition is a parameter associated with a battery coupled to the wireless power transfer overvoltage protection system, the parameter being selected from a group consisting of a voltage of the battery and a state of charge of the battery and wherein the control module is further configured to control the first switching device to switch from the second state to the first state when the parameter is exceeded.

16. A battery charging system for a vehicle comprising:
a wireless power transfer circuit including an inverter and transmitting inductor and resonant capacitor configured to inductively provide power to a resonant receiving circuit;
the resonant receiving circuit comprising, an inductor, a resonant capacitor and a first switching device, the inductor having a first end and a second end, the first switching device being connected between the first end and the second end of the inductor, the resonant receiving circuit being connected to a rectifier and a filter capacitor, the first switching device having a first state in which the first end and the second end of the inductor are electrically coupled to each other through the first switching device, and a second state in which the inductor and resonant capacitor are capable of resonating;
a battery coupled to the resonant receiving circuit for receiving power inductively provided to the resonant receiving circuit; and
a control module configured to control the first switching device to switching between the first state and the second state when the resonant receiving circuit is charging load and a preset condition is satisfied and otherwise, the first switching device is maintained in the first state.

17. The battery charging system of claim 16, wherein the vehicle is an electric vehicle.

18. The battery charging system of claim 16, wherein the vehicle is a hybrid electric vehicle.

19. The battery charging system of claim 16, wherein the control module is further configured to communicate the monitored DC voltage level to a power controller coupled to the inverter.

20. The battery charging system of claim 16, wherein the vehicle is selected from a group consisting of land, water or air-based vehicles.

* * * * *